(12) United States Patent
Tang et al.

(10) Patent No.: US 11,962,411 B2
(45) Date of Patent: Apr. 16, 2024

(54) DATA RETRANSMISSION METHOD BASED ON A CODE BLOCK GROUP

(71) Applicant: LITE-ON TECHNOLOGY CORPORATION, Taipei (TW)

(72) Inventors: Chien-Hsin Tang, Taipei (TW); Chih Wei Su, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 340 days.

(21) Appl. No.: 17/666,936

(22) Filed: Feb. 8, 2022

(65) Prior Publication Data

US 2022/0166552 A1 May 26, 2022

(30) Foreign Application Priority Data

Jan. 13, 2022 (CN) .......................... 202210037649.5

(51) Int. Cl.
*H04W 72/02* (2009.01)
*H04L 1/08* (2006.01)
(Continued)

(52) U.S. Cl.
CPC ............... *H04L 1/08* (2013.01); *H04W 72/02* (2013.01); *H04W 72/0446* (2013.01);
(Continued)

(58) Field of Classification Search
CPC ........ H04L 1/08; H04L 1/1893; H04W 72/02; H04W 72/0446; H04W 72/0453; H04W 72/1263; H04W 72/23
See application file for complete search history.

(56) References Cited

U.S. PATENT DOCUMENTS

2019/0045533 A1* 2/2019 Chatterjee ............... H04L 5/001
2019/0364548 A1* 11/2019 Nammi ................. H04L 1/1861
(Continued)

FOREIGN PATENT DOCUMENTS

WO 2020/230008 A1 11/2020

OTHER PUBLICATIONS

Chinese language office action dated Jul. 10, 2023, issued in application No. TW 111101471.

*Primary Examiner* — Lakeram Jangbahadur
(74) *Attorney, Agent, or Firm* — McClure, Qualey & Rodack, LLP

(57) ABSTRACT

A data retransmission method includes configuring the quantity of code block groups in a transport block and configuring a plurality of physical resource groups; configuring the quantity of physical resources included in each of the physical resource groups according to the different quantities of code block groups; selecting the physical resources included in the physical resource group that corresponds to the initial transmission to send the transport block; determining the quantity of code block groups that were erroneously sent in the transport block according to the response; selecting one of the physical resources in one of the physical resource groups that corresponds to the retransmission to send at least one code block group that was erroneously sent according to the quantity of code block groups that were erroneously sent; and completing the retransmission only after all of the code block groups in the transport block have been successfully sent.

16 Claims, 12 Drawing Sheets

(51) Int. Cl.
*H04W 72/0446* (2023.01)
*H04W 72/0453* (2023.01)
*H04W 72/1263* (2023.01)
*H04W 72/23* (2023.01)

(52) U.S. Cl.
CPC ... *H04W 72/0453* (2013.01); *H04W 72/1263* (2013.01); *H04W 72/23* (2023.01)

(56) References Cited

U.S. PATENT DOCUMENTS

| | | | |
|---|---|---|---|
| 2021/0167894 A1* | 6/2021 | Park | H04L 5/0053 |
| 2021/0226737 A1* | 7/2021 | Huang | H04W 52/0229 |
| 2022/0209898 A1* | 6/2022 | Karaki | H04W 72/23 |

\* cited by examiner

DATA RETRANSMISSION METHOD BASED ON A CODE BLOCK GROUP

CROSS REFERENCE TO RELATED APPLICATIONS

This application claims the benefit of China Application No. 202210037649.5, filed on Jan. 13, 2022, the entirety of which is/are incorporated by reference herein.

BACKGROUND OF THE INVENTION

Field of the Invention

The present invention relates to a data retransmission method, and, in particular, to the data retransmission method based on a code block group.

Description of the Related Art

In the 5G New Radio (NR) system, the base station needs to transmit downlink control information (DCI) for scheduling the Physical Downlink Shared Channel (PDSCH) or the Physical Uplink Shared Channel (PUSCH) to the UE before performing downlink transmission or uplink transmission of the transport block. On the other hand, both the base station and the UE can use semi-persistent scheduling (SPS) and transmission without a dynamic grant (TWG) transmission mechanism, so that the base station pre-configures the time-frequency resources available to both the base station and the UE.

However, no matter which method is used, when a base station or a UE performs retransmission of a transport block or code block group (CBG), the base station needs to send DCI to the UE to reallocate the time-frequency resources of the transport block/code block group. The UE needs to wait to receive DCI from the base station so that the UE can know the time-frequency resource information used for retransmission. This means an increase in communication delay and control signaling overhead. Therefore, the design of retransmission without using DCI is a topic worthy of discussion.

BRIEF SUMMARY OF THE INVENTION

An embodiment of the present invention provides a data retransmission method based on a code block group (CBG). The data retransmission method is suitable for downlink transmission. The data retransmission method for sending a transport block (TB) to a receiving end includes: configuring the quantity of at least one code bock group comprised in the transport block by sending a control signaling to the receiving end; configuring a plurality of physical resource groups by sending the control signaling to the receiving end; wherein each of the physical resource groups corresponds to different rounds of transmission; configuring the quantity of a plurality of physical resources comprised in each of the physical resource groups according to the different quantities of code block groups by sending the control signaling to the receiving end, each of the physical resources corresponds to the different quantities of code block groups that were erroneously sent; selecting the physical resources comprised in one of the physical resource groups corresponding to the initial transmission to send the transport block; determining the quantity of code block groups that were erroneously sent in the transport block according to the response from the receiving end; selecting one of the physical resources in one of the physical resource groups corresponding to a retransmission to send the code block group that was erroneously sent according to the quantity of code block groups that were erroneously sent in the transport block; and not completing the retransmission until confirming that all of the code block groups in the transport block have been successfully sent.

According to the data retransmission method described above, the total quantity of physical resources comprised in the physical resource group corresponding to the retransmission is equal to the quantity of code block groups.

According to the data retransmission method described above, the physical resources partially overlap each other in a time-frequency domain.

According to the data retransmission method described above, the method further includes configuring the quantity of physical resources comprised in each of the physical resource groups according to the different quantities of code block groups and the different quantities of code blocks comprised in each code block group by sending the control signaling to the receiving end, the physical resources comprised in each of the physical resource groups correspond to the different quantities of code block groups that were erroneously sent in the transport block and the different quantities of code blocks comprised in each of the code block groups; determining the size of the transport block according to a channel status; and sending information about the size of the transport block to the receiving end by sending the control signaling to the receiving end.

According to the data retransmission method described above, the method further includes determining the quantity of code blocks comprised in each code block group according to the size of the transport block and the quantity of code block groups comprised in the transport block.

According to the data retransmission method described above, the method further includes selecting the physical resource comprised in the physical resource group corresponding to the retransmission to send the code block group that was erroneously sent in the transport block according to the quantity of code block groups that were erroneously sent and the quantity of code blocks comprised in each of the code block groups.

According to the data retransmission method described above, the total quantity of physical resources comprised in the physical resource group corresponding to the retransmission is equal to the product of the quantity of code block groups and the quantity of code blocks comprised in each of the code block groups.

According to the data retransmission method described above, the method further includes: configuring parameters associated with semi-persistent scheduling (SPS) and enabling the semi-persistent scheduling, by sending the control signaling to the receiving end; configuring the plurality of physical resource groups associated with the SPS by sending the control signaling to the receiving end, each of the physical resource groups associated with the SPS corresponds to different rounds of transmission; configuring the quantity of a plurality of physical resources comprised in each of the physical resource groups associated with the SPS according to the different quantities of code block groups by sending the control signaling to the receiving end, each of the physical resources corresponds to the different quantities of code block groups that were erroneously sent; selecting the physical resources comprised in one of the physical resource groups associated with the SPS corresponding to the initial transmission associated with the SPS to send the transport block; determining the quantity of code block groups that were erroneously sent in the transport block according to the response from the receiving end; selecting one of the physical resources in one of the physical resource groups associated with the SPS corresponding to a retransmission associated with the SPS to send the code block group that was erroneously sent according to the quantity of code block groups that were erroneously sent in the transport block; and not completing the retransmission associated with the SPS until confirming that all of the code block groups in the transport block have been successfully sent.

According to the data retransmission method described above, the method further includes configuring the quantity of physical resources comprised in each of the physical resource groups associated with the SPS according to the different quantities of code block groups and the different quantities of code blocks comprised in each code block group by sending the control signaling to the receiving end; wherein the physical resources comprised in each of the physical resource groups associated with the SPS correspond to the different quantities of code block groups that were erroneously sent in the transport block and the different quantities of physical resources comprised in each of the physical resource groups; determining the size of the transport block according to a channel status; sending information about the size of the transport block to the receiving end by sending the control signaling to the receiving end; and determining the quantity of code blocks comprised in each code block group according to the size of the transport block and the quantity of code block groups comprised in the transport block.

According to the data retransmission method described above, the method further includes selecting the physical resource comprised in the physical resource group associated with the SPS corresponding to the retransmission associated with the SPS to send the code block group that was erroneously sent in the transport block according to the quantity of code block groups that were erroneously sent in the transport block and the quantity of code blocks comprised in each of the code block groups.

An embodiment of the present invention provides a data retransmission method based on a code block group. The data retransmission method is suitable for uplink transmission. The data retransmission method for sending a transport block (TB) to a receiving end includes: configuring parameters associated with transmission without a dynamic grant (TWG), enabling the TWG, and configuring the size of each of the physical resources corresponding to the initial transmission, by receiving a control signaling; configuring a quantity of at least one code block group comprised in the transport block by receiving the control signaling; configuring a plurality of physical resource groups by receiving the control signaling, each of the physical resource groups corresponds to different rounds of transmission; configuring a quantity of a plurality of physical resources comprised in each of the physical resource groups according to the different quantities of code block groups by receiving the control signal, each of the physical resources corresponds to the different quantities of code block groups that were erroneously sent; selecting the physical resources comprised in one of the physical resource groups corresponding to the initial transmission to send the transport block; determining the quantity of code block groups that were erroneously sent in the transport block according to the response from the receiving end; selecting one of the physical resources in one of the physical resource groups corresponding to a retransmission to send the code block group that was erroneously sent according to the quantity of code block groups that were erroneously sent in the transport block; and not completing the retransmission until confirming that all of the code block groups in the transport block have been successfully sent.

According to the data retransmission method described above, the method further includes: configuring the quantity of physical resources comprised in each of the physical resource groups according to the different quantities of code block groups and the different quantities of code blocks comprised in each code block group by receiving the control signaling, the physical resources comprised in each of the physical resource groups correspond to different quantities of code block groups that were erroneously sent in the transport block and different quantities of code blocks comprised in each of the code block groups; determining the size of the actual transport block according to the size of each of the physical resources corresponding to the initial transmission, the size of the actual transport block is not greater than the size of each of the physical resources corresponding to the initial transmission; determining the quantity of code blocks comprised in each code block group according to the size of the actual transport block and the quantity of code block groups comprised in the transport block; selecting the physical resources comprised in one of the physical resource groups corresponding to the initial transmission to send the actual transport block; determining the quantity of code block groups that were erroneously sent in the actual transport block according to the response from the receiving end; selecting the physical resource comprised in the physical resource group corresponding to the retransmission to send the code block group that was erroneously sent in the actual transport block according to the quantity of code block groups that were erroneously sent in the actual transport block and the quantity of code blocks comprised in each of the code block groups; and not completing the retransmission until confirming that all of the code block groups in the actual transport block have been successfully sent.

According to the data retransmission method described above, the response from the receiving end is configured grant downlink feedback information (CG-DFI); the CG-DFI comprises an acknowledgement message (ACK/NACK) corresponding to each of the code block groups in the transport block.

According to the data retransmission method described above, the receiving end is a base station; when the base station receives the transport block, the base station blindly measures the quantity of code blocks comprised in each of the code block groups in the transport block.

According to the data retransmission method described above, the total quantity of physical resources comprised in the physical resource group corresponding to the retransmission is equal to the quantity of code block groups.

According to the data retransmission method described above, the total quantity of physical resources comprised in the physical resource group corresponding to the retransmission is equal to the product of the quantity of code block groups and the quantity of code blocks comprised in each code block group.

According to the data retransmission method described above, the physical resources partially overlap each other in a time-frequency domain.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
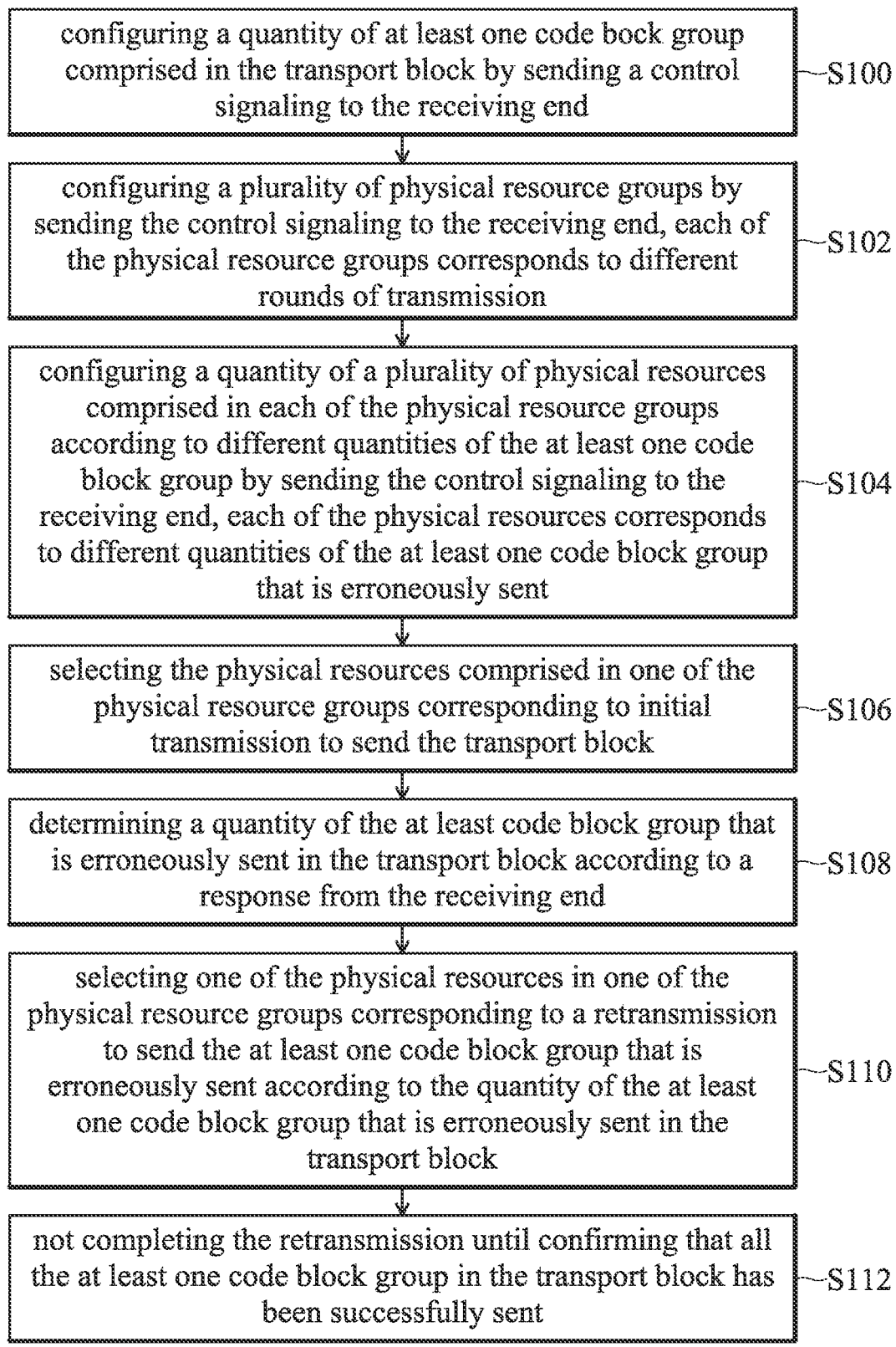
FIG. 1 is a flowchart of a data retransmission method based on a code block group in accordance with some embodiments of the present invention.

FIG. 1 is a flowchart of a data retransmission method based on a code block group in accordance with some embodiments of the present invention. The flow chart in FIG. 1 is for downlink transmission. As shown in FIG. 1, the retransmission method based on a code block group of the present invention includes: configuring a quantity of at least one code block group comprised in a transport block (TB) by sending a control signaling to the receiving end (step S100) (3GPP TS 38.331); configuring a plurality of physical resource groups by sending the control signaling to the receiving end, each of the physical resource groups corresponds to different rounds of transmission (step S102); configuring a quantity of a plurality of physical resources comprised in each of the physical resource groups according to the different quantities of code block groups by sending the control signaling to the receiving end, each of the physical resources corresponds to the different quantities of code block groups that were erroneously sent (step S104); selecting the physical resources comprised in one of the physical resource groups corresponding to the initial transmission to send the transport block (step S106); determining the quantity of code block groups that were erroneously sent in the transport block according to the response from the receiving end (step S108); selecting one of the physical resources in one of the physical resource groups corresponding to the retransmission to send the code block group that was erroneously sent according to the quantity of code block groups that were erroneously sent in the transport block (step S110); and not completing the retransmission until confirming that all of the code block groups in the transport block have been successfully sent (step S112).

In step S100, the base station configures the quantity of code block groups included in the transport block by sending a control signaling to the receiving end (TS 38.331). The control signaling may be, for example, a radio resource control (RRC) signaling, a physical layer (L1)/data link layer (L2) control signaling, or both. In step S100, the receiving end may be user equipment (UE), but the present invention is no limited thereto. In step S100, a transport block usually includes 2, 4, 6, or 8 code group groups, but the present invention is not limited thereto. In step S102, the present invention defines a physical resource as the resource including numbers of frequency-domain units (e.g., numbers of 5G NR resource blocks spanning the frequency domain), and numbers of time-domain units (e.g., numbers of OFDM symbols or a time slot), and/or using a specific non-orthogonal/orthogonal pattern (e.g., orthogonal cover code (OCC)). For example, if a transmitter transmits data to a receiver on a time-frequency resource but separately using two or more different orthogonal patterns in order to separate the two or more transmissions on the same time-frequency resource in the receiver, the present invention considers the transmitter uses two or more physical resources to transmit the data to the receiver.

In addition, different physical resources which are used by a transmitter to transmit data to a receiver are not necessarily orthogonal each other. If a transmitter transmits data to a receiver on a time-frequency resource using two or more non-orthogonal codes (e.g., spreading codes) or using a multi-antenna transmission scheme (e.g., spatial multiplexing) or using any method that enables the receiver can distinguish two or more parallel transmissions from the transmitter on the same time-frequency resource, the present invention considers the transmitter uses two or more physical resources on the same time-frequency resource to transmit data to the receiver.

The spatial multiplexing implies the transmission of multiple layers, that is, multiple parallel transmissions on the same time-frequency resource to a receiver. The presence of multiple antennas at both the transmitter and receiver in combination with transmitter and/or receiver signal processing is used to suppress interference between different layers. The spatial multiplexing has often been referred to as Multi-Input-Multi-Output (MIMO) transmission, reflecting the fact that the channel in the case of spatial multiplexing can be seen as having multiple inputs, corresponding to the multiple transmitting antennas, and multiple outputs, corresponding to multiple receiving antennas.

In step S102, the base station may configure a plurality of physical resource groups by sending a control signaling to a receiving end (e.g., user equipment). For example, the base station is configured to transmit on a first physical resource group in an initial transmission, to transmit on a second physical resource group in a first retransmission, and to transmit on a third physical resource group in a second retransmission. In some embodiments, the first physical resource group, the second physical resource group, and the third physical resource group do not overlap each other in time-frequency domain. In step S104, the base station configures a quantity of a plurality of physical resources included in each of the physical resource groups according to the different quantities of code block groups by sending the control signaling to the receiving end, each of the physical resources corresponds to the different quantities of code block groups that were erroneously sent. In other words, in step S104, the base station pre-configures physical resources corresponding to the different quantities of code block groups that were erroneously sent in the transport block. In step S106, the base station selects the physical resources included in one of the physical resource groups corresponding to the initial transmission (for example, the first physical resource group) to send the transport block. In step S108, the base station determines the quantity of code block groups that were erroneously sent in the transport block according to the response from the receiving end. In some embodiments, the response can be, for example, a positive acknowledgement message (ACK) or a negative acknowledgement message (NACK). For example, the user equipment receives a transport block having four code block groups from the base station. However, during the receiving process, the UE only successfully receives 2 code block groups, so there are 2 code block groups with transmission errors. The UE sends 2 negative acknowledgement messages (NACK) to the base station to inform the base station that there are 2 code block groups that are erroneously sent.

The second physical resource group used for the first retransmission includes a plurality of physical resources, such as a first physical resource, a second physical resource, . . . , the Lth physical resource. In step S110, when there is one code block group that was erroneously sent, the base station selects the first physical resource in the second physical resource group to send the one code block group that was erroneously sent in the first retransmission. When there are two code block groups that are erroneously sent, the base station selects the second physical resource in the second physical resource group to send the two code block groups that are erroneously sent in the first retransmission. When there are x code block groups that are erroneously sent, the base station selects the xth physical resource in the second physical resource group to send the x code block groups that are erroneously sent in the first retransmission. In some embodiments, the first physical resource, the second physical resource, . . . , the xth physical resource partially overlap each other in time-frequency domain. Since the base station only uses one of the physical resources in the second physical resource group in the first retransmission, the physical resources partially overlap each other in time-frequency domain, which can effectively reduce the occupied bandwidth. In some embodiments, the total quantity of physical resources included in the second physical resource group corresponding to the first retransmission is equal to the quantity of code block groups.

In step S112, the base station may not complete the retransmission until confirming that all of the code block groups in the transport block have been successfully sent. For example, when the transport block includes 4 code block groups, the base station must receive a total of 4 positive acknowledgement messages (ACK) from the UE to confirm that all code block groups have been successfully sent. For example, the base station receives 2 positive acknowledgement messages (ACK) in the initial transmission, indicating that the transmission of the 2 code block groups in the transport block in the initial transmission has been successful, but the transmission of the other 2 code block groups has failed. Then, in the first retransmission, the base station receives a positive acknowledgement message (ACK), indicating that one code block group in the transport block in the first retransmission has been successfully sent, but there is the other code block group that was erroneously sent. Furthermore, in the second retransmission, the base station receives the last positive acknowledgement message (ACK). Since the base station has received a total of 4 positive acknowledgement messages (ACK), the base station determines that the retransmission has been completed.

Figure 2A:
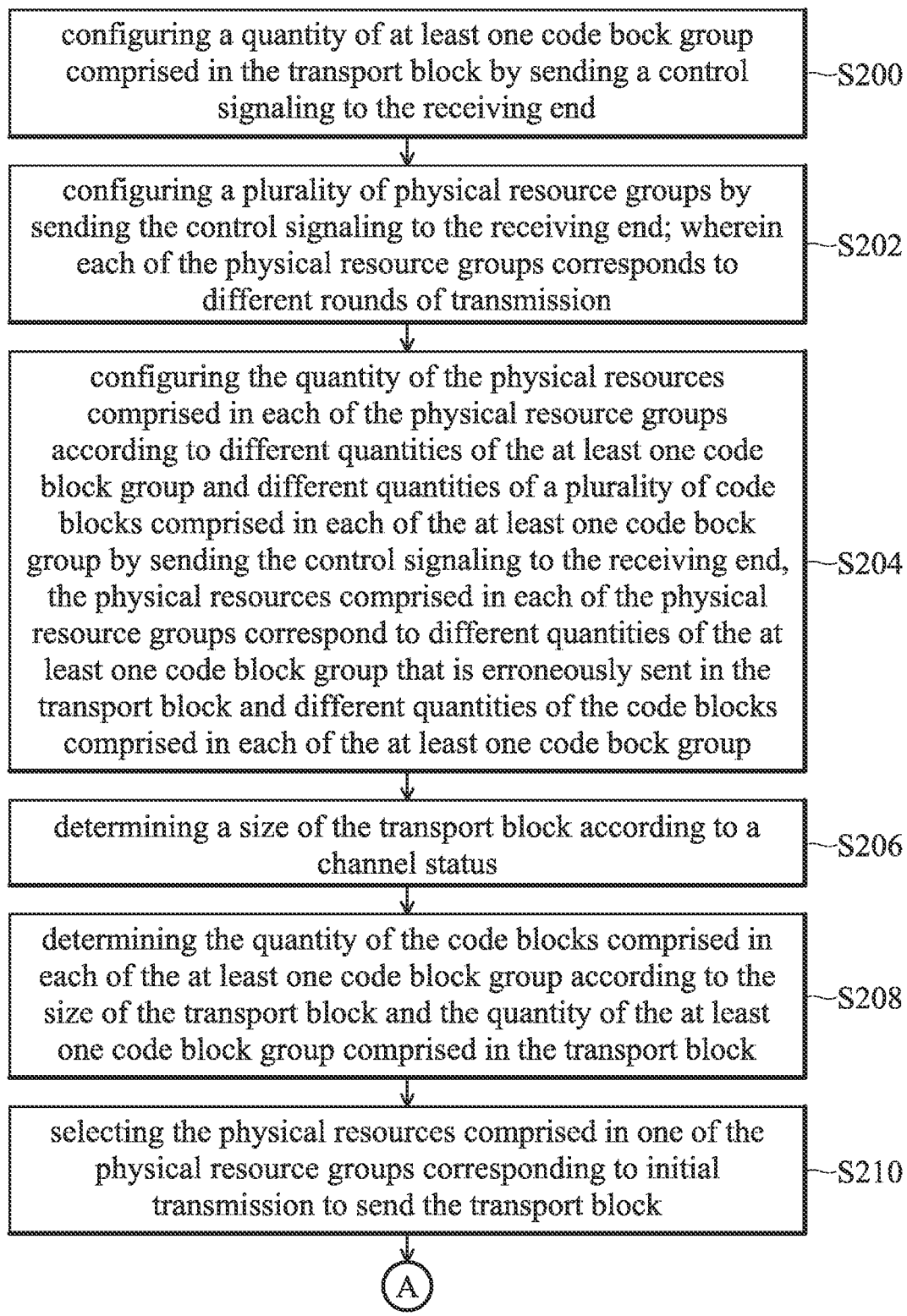
FIGS. 2A and 2B are flowcharts of a data retransmission method based on a code block group in accordance with another embodiment of the present invention.
Figure 2B:
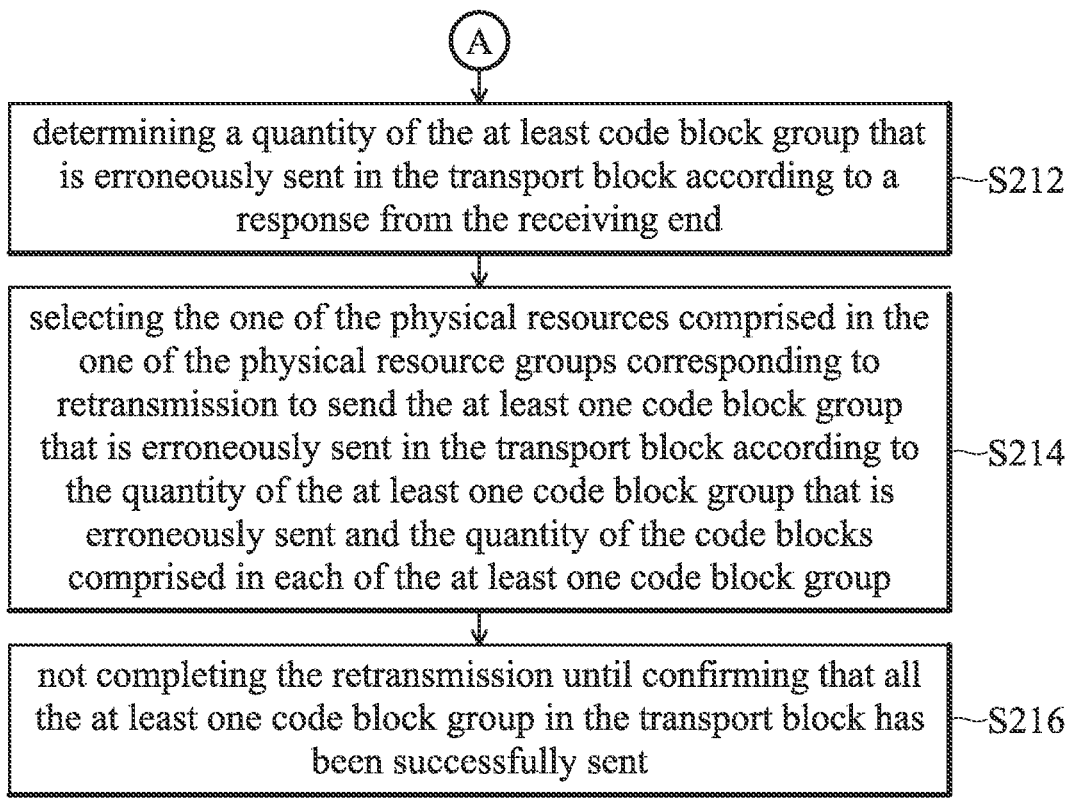

FIGS. 2A and 2B are flowcharts of a data retransmission method based on a code block group in accordance with another embodiment of the present invention. The flowcharts in FIGS. 2A and 2B are for downlink transmission. As shown in FIGS. 2A and 2B, the retransmission method based on a code block group of the present invention includes: configuring a quantity of at least one code block group included in a transport block by sending a control signaling to the receiving end (step S200) (3GPP TS 38.331); configuring a plurality of physical resource groups by sending the control signaling to the receiving end, each of the physical resource groups corresponds to different rounds of transmission (step S202); configuring the quantity of physical resources included in each of the physical resource groups according to the different quantities of code block groups and the different quantities of code blocks included in each code block group by sending the control signaling to the receiving end, the physical resources included in each of the physical resource groups correspond to different quantities of code block groups that were erroneously sent in the transport block and different quantities of code blocks comprised in each code block group (step S204); determining the size of the transport block according to a channel status (step S206); determining the quantity of code blocks included in each of the code block groups according to the size of the transport block and the quantity of code block groups included in the transport block (step S208); selecting the physical resources included in one of the physical resource groups corresponding to the initial transmission to send the transport block (step S210); determining the quantity of code block groups that were erroneously sent in the transport block according to the response from the receiving end (step S212); selecting the physical resource included in the physical resource group corresponding to the retransmission to send the code block group that was erroneously sent in the transport block according to the quantity of code block groups that were erroneously sent and the quantity of code blocks included in each code block group (step S214); and not completing the retransmission until confirming that all of the code block groups in the transport block have been successfully sent (step S216).

In step S200, the base station configures the quantity of code block groups included in the transport block by sending the control signaling to the receiving end. The control signaling may be, for example, a radio resource control (RRC) signaling, a physical layer (L1)/data link layer (L2) control signaling, or both. In step S200, the receiving end may be user equipment (UE), but the present invention is no limited thereto. In step S200, a transport block usually includes 2, 4, 6, or 8 code group groups, but the present invention is not limited thereto. In step S202, the base station may configure a plurality of physical resource groups by sending a control signaling to a receiving end (e.g., user equipment). Each of the physical resource groups corresponds to different rounds of transmission. For example, the base station is configured to transmit on a first physical resource group in an initial transmission, to transmit on a second physical resource group in a first retransmission, and to transmit on a third physical resource group in a second retransmission. In some embodiments, the first physical resource group, the second physical resource group, and the third physical resource group do not overlap each other in time-frequency domain.

In step S204, the base station configures the quantity of physical resources included in each of the physical resource groups according to the different quantities of code block groups and the different quantities of code blocks included in each of the code block groups by sending the control signaling to the receiving end. For example, assuming that a transport block has been configured to include 4 code block groups in step S200, and the quantity of code blocks included in each code block group is M, the base station can configure each physical resource group to include 4*M physical resources. In some embodiments, the quantity of code blocks included in each code block group can be defined in the specification of 3GPP. In some embodiments, the physical resources included in each of the physical resource groups correspond to the different quantities of code block groups that were erroneously sent in the transport block and the different quantities of code blocks included in each of the code block groups. For example, the second physical resource group used for the first retransmission includes a plurality of physical resources, such as the first physical resource, the second physical resource, . . . , the Mth physical resource, the M+1th physical resource, the M+2th physical resource, . . . , the 2Mth physical resource. The first physical resource corresponds to 1 code block group that was erroneously sent and each code block group having 1 code block. The second physical resource corresponds to 1 code block group that was erroneously sent and each code block group having 2 code blocks. The Mth physical resource corresponds to 1 code block group that was erroneously sent and each code block group having M code blocks. Similarly, The M+1th physical resource corresponds to 2 code block groups that are erroneously sent and each code block group having 1 code block. The M+2th physical resource corresponds to 2 code block groups that are erroneously sent and each code block group having 2 code blocks. In other words, in the case of different quantities of code block groups and each code block group includes different quantities of code blocks, the base station pre-configures (or reserves) physical resources corresponding to the situation, so as to use the corresponding physical resources to send the transport block.

In step S206, the base station determines the size of the transport block according to the channel status. For example, when the channel status is better, the base station can transmit a transport block with a larger amount of data at a time. In contrast, when the channel status is poor, the base station can only transmit a transport block with a small amount of data. In some embodiments, the base station sends the information of the size of the transport block and the quantity of code blocks included in each code block group to the receiving end by sending the control signaling to the receiving end. In step S208, the base station determines the quantity of code blocks included in each code block group according to the size of the transport block and the quantity of code block groups included in the transport block. In some embodiments, the base station divides the size of the transport block by the quantity of code block groups included in the transport block to obtain the size of one code block group. In step S210, the base station selects a physical resource included in one of the physical resource groups corresponding to the initial transmission (e.g. the first physical resource group) to send the transport block.

In step S212, the base station receives a response from the UE to determine the quantity of code block groups that are erroneously sent in the transport block. In some embodiments, the response can be, for example, a positive acknowledgement message (ACK) or a negative acknowledgement message (NACK). For example, the user equipment receives a transport block having four code block groups from the base station. However, during the receiving process, the UE only successfully receives 2 code block groups, so there are 2 code block groups with transmission errors. The UE sends 2 negative acknowledgement messages (NACK) to the base station to inform the base station that there are 2 code block groups that are erroneously sent.

In step S214, the second physical resource group used for the first retransmission includes a plurality of physical resources, such as the first physical resource, the second physical resource, . . . , the Mth physical resource, the M+1th physical resource, the M+2th physical resource, . . . , the 2Mth physical resource. The quantity of the foregoing physical resources is only an example, and is not intended to the limitation of the present invention. In step S212, when there is 1 code block group that was erroneously sent and each code block group has 1 code block, the base station selects the first physical resource in the second physical resource group to send the one code block group that was erroneously sent in the first retransmission. When there is 1 code block group that was erroneously sent and each code block group has 2 code blocks, the base station selects the second physical resource in the second physical resource group to send the one code block group that was erroneously sent in the first retransmission. When there is 1 code block group that was erroneously sent and each code block group has M code blocks, the base station selects the Mth physical resource in the second physical resource group to send the one code block group that was erroneously sent in the first retransmission.

Similarly, when there are 2 code block groups that are erroneously sent and each code block group has 1 code block, the base station selects the M+1th physical resource in the second physical resource group to send the two code block groups that are erroneously sent in the first retransmission. When there are 2 code block groups that are erroneously sent and each code block group has 2 code blocks, the base station selects the M+2th physical resource in the second physical resource group to send the two code block groups that are erroneously sent in the first retransmission. When there are 2 code block groups that are erroneously sent and each code block group has a maximum of M code blocks, the base station selects the 2Mth physical resource in the second physical resource group to send the two code block groups that are erroneously sent in the first retransmission. In conclusion, when there are x code block groups that are erroneously sent and each code block group has a maximum of M code blocks, the base station selects the [(x−1)*(M+m)]th physical resource in the corresponding physical resource group to send the x code block groups that are erroneously sent in the retransmission. M is the maximum value of the quantity of code blocks in each code block group, and m is the quantity of code blocks included in each code block group in the initial transmission. In some embodiments, x is a positive integer between 1~L, and m is a positive integer between 1~M.

In some embodiments, the first physical resource, the second physical resource, . . . , the Mth physical resource, the M+1th physical resource, the M+2th physical resource, . . . , the 2Mth physical resource in the second physical resource group partially overlap each other in time-frequency domain. In some embodiments, the total quantity of physical resources included in the second physical resource group corresponding to the retransmission is equal to the product (L*M) of the quantity (L) of code block groups and the maximum quantity (M) of code blocks included in each code block group.

Figure 3:
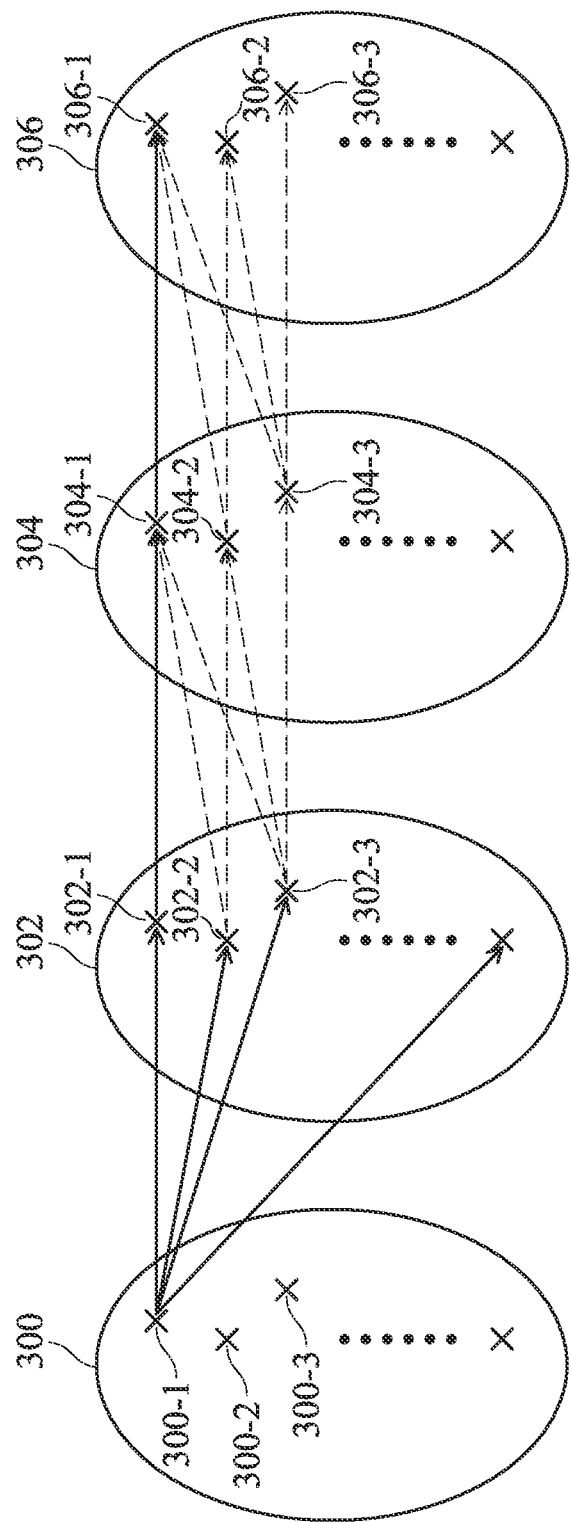
FIG. 3 is a schematic diagram of configuring at least one physical resource group and a plurality of physical resources in accordance with some embodiments of the present invention.

FIG. 3 is a schematic diagram of configuring at least one physical resource group and a plurality of physical resources in accordance with some embodiments of the present invention. As shown in FIG. 3, the base station configures a physical resource group 300, a physical resource group 302, a physical resource group 304, and a physical resource group 306 by sending the control signaling to the receiving end in step S102 in FIG. 1. In other words, the physical resource groups 300, 302, 304 and 306 shown in FIG. 3 correspond to the steps in FIG. 1. The present invention only lists 4 physical resource groups, but does not limit their actual quantity. The physical resource group 300 is for the initial transmission, the physical resource group 302 is for the first retransmission, the physical resource group 304 is for the second retransmission, and the physical resource group 306 is for the third retransmission. In some embodiments, the physical resource group 300 includes a physical resource 300-1, a physical resource 300-2, a physical resource 300-3, . . . , etc. The physical resource group 302 includes a physical resource 302-1, a physical resource 302-2, a physical resource 302-3, . . . , a physical resource 302-L. The physical resource group 304 includes a physical resource 304-1, a physical resource 304-2, a physical resource 304-3, . . . , a physical resource 304-L. The physical resource group 306 includes a physical resource 306-1, a physical resource 306-2, a physical resource 306-3, . . . , a physical resource 306-L.

In the initial transmission, the base station selects the physical resource 300-1 in the physical resource group 300 by sending the control signaling to the receiving end to send the transport block. In some embodiments, the base station can also select the physical resource 300-2 or 300-3 in the physical resource group 300 by sending the control signaling to the receiving end to send the transport block. In some embodiments, it is assumed that the base station configures the transport block into L code block groups in step S100 by sending the control signaling to the receiving end. When there is one code block group that was erroneously sent in the initial transmission, the base station selects the code block 302-1 in the code block group 302 to send the one code block group that was erroneously sent in the first retransmission. When there are two code block groups that are erroneously sent in the initial transmission, the base station selects the code block 302-2 in the code block group 302 to send the two code block groups that are erroneously sent in the first retransmission. When there are three code block groups that are erroneously sent in the initial transmission, the base station selects the code block 302-3 in the code block group 302 to send the three code block groups that are erroneously sent in the first retransmission.

Similarly, when there is still one code block group that was erroneously sent in the first transmission, the base station selects the code block 304-1 in the code block group 304 to send the one code block group that was erroneously sent in the second retransmission. When there are still two code block groups that are erroneously sent in the first transmission, the base station selects the code block 304-2 in the code block group 304 to send the two code block groups that are erroneously sent in the second retransmission. When there are still three code block groups that are erroneously sent in the first transmission, the base station selects the code block 304-3 in the code block group 304 to send the three code block groups that are erroneously sent in the second retransmission. When there is still one code block group that was erroneously sent in the second transmission, the base station selects the code block 306-1 in the code block group 306 to send the one code block group that was erroneously sent in the third retransmission. When there are still two code block groups that are erroneously sent in the second transmission, the base station selects the code block 306-2 in the code block group 306 to send the two code block groups that are erroneously sent in the third retransmission. When there are still three code block groups that are erroneously sent in the second transmission, the base station selects the code block 306-3 in the code block group 306 to send the three code block groups that are erroneously sent in the third retransmission.

Figure 4:
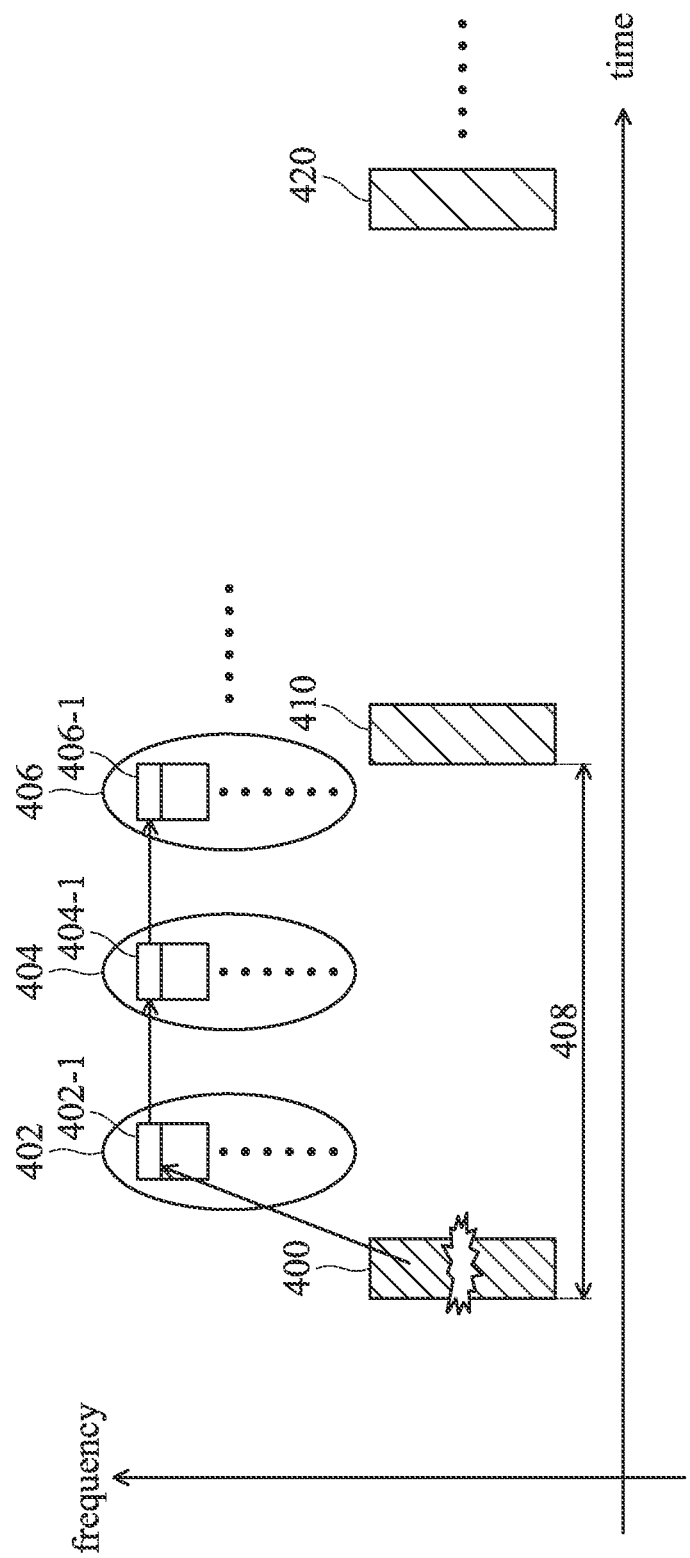
FIG. 4 is a schematic diagram of applying the data retransmission method of the present invention to semi-persistent scheduling (SPS) in accordance with some embodiments of the present invention.

FIG. 4 is a schematic diagram of applying the data retransmission method of the present invention to semi-persistent scheduling (SPS) in accordance with some embodiments of the present invention. In some embodiments, the base station sends the control signaling to the receiving end to configure parameters associated with the semi-persistent scheduling, and to enable the semi-persistent scheduling. In some embodiments, the parameters associated with the SPS includes: Configured Scheduling Radio Network Temporary Identifier (cs-RNTI) (3GPP TS 38.331), and number of Configured Hybrid Automatic Repeat Request (HARQ) for SPS downlink, but the present invention is not limited thereto. The base station configures a physical resource 400, a physical resource group 402, a physical resource group 404, a physical resource group 406, a physical resource 410, and a physical resource 420 by sending the control signaling to the receiving end. The physical resource 400 associated with the SPS is used for the initial transmission. The physical resource group 402 associated with the SPS is used for the first retransmission. The physical resource group 404 associated with the SPS is used for the second retransmission. The physical resource group 406 associated with the SPS is used for the third retransmission. The physical resource 410 is used for the second initial transmission. The physical resource 420 is used for the third initial transmission.

In some embodiments, the base station further configures physical resources included in each of the physical resource groups 402, 404, and 406 by sending the control signaling to the receiving end, and configures the physical resources 400, 410, and 420 by sending the control signaling to the receiving end. In some embodiments, the physical resources included in each of the physical resource groups 402, 404 and 406 correspond to the different quantities of code block groups that were erroneously sent in the transport block.

In some embodiments, the base station selects the physical resource 400 corresponding to the initial transmission to send the transport block. Then, the base station determines the quantity of code block groups that were erroneously sent in the transport block according to the response from the receiving end. The base station selects the physical resource 402-1 included in the physical resource group 402 corresponding to the first retransmission according to the quantity of code block groups that were erroneously sent in the transport block to send the code block groups that were erroneously sent in the transport block. If the base station determines that there are still code block groups that are erroneously sent in the transport block in the first transmission according to the response from the receiving end, the base station selects the physical resource 404-1 included in the physical resource group 404 corresponding to the second retransmission according to the quantity of code block groups that are erroneously sent in the transport block to send the code block groups that are erroneously sent in the transport block. In some embodiments, the physical resource 410 or 420 may partially overlap with the physical resources 402-1, 404-1, and 406-1, but the present invention is not limited thereto.

Similarly, if there are still code block groups that are erroneously sent in the second retransmission, the base station selects the physical resource 406-1 included in the physical resource group 406 corresponding to the third retransmission according to the quantity of code block groups that are erroneously sent in the transport block to send the code block groups that are erroneously sent in the transport block. The retransmission associate with the SPS is not completed until the base station confirms that all code block groups in the transport block have been successfully sent. In some embodiments, a time slot 408 is the time interval between the physical resource 400 and the physical resource 410. In other words, the time slot 408 is the time interval between the initial transmission and the second initial transmission. In some embodiments, the physical resources 410 and 420 are resources configured in advance.

In some embodiments, in another application of the SPS, the base station further configures physical resources included in each of the physical resource groups 402, 404 and 406 and the physical resources 400, 410 and 420 by sending the control signaling to the receiving end. For example, the physical resources included in each of the physical resource groups 402, 404, and 406 correspond to the different quantities of code block groups that were erroneously sent in the transport block and the different quantities of code blocks included in each code block group. The base station determines the size of the transport block according to the channel status. The base station may divide the size of the transport block by the quantity of code block groups included in the transport block to obtain the size of one code block group. The size of a code block is defined in the 5G NR specification, so the base station can calculate the quantity of code blocks included in the code block group according to the size of one code block group and the size of one code block. In some embodiments, the quantity of code blocks included in each code block group can be defined in the specification. In some embodiments, the base station sends information of the size of the transport block and the quantity of code blocks included in each code block group to the receiving end by sending the control signaling to the receiving end. In the application of the SPS, the data retransmission method based on a code block group of the present invention is the same as the steps S210~S216 in FIGS. 2A and 2B, so it will not be repeated.

Figure 5A:
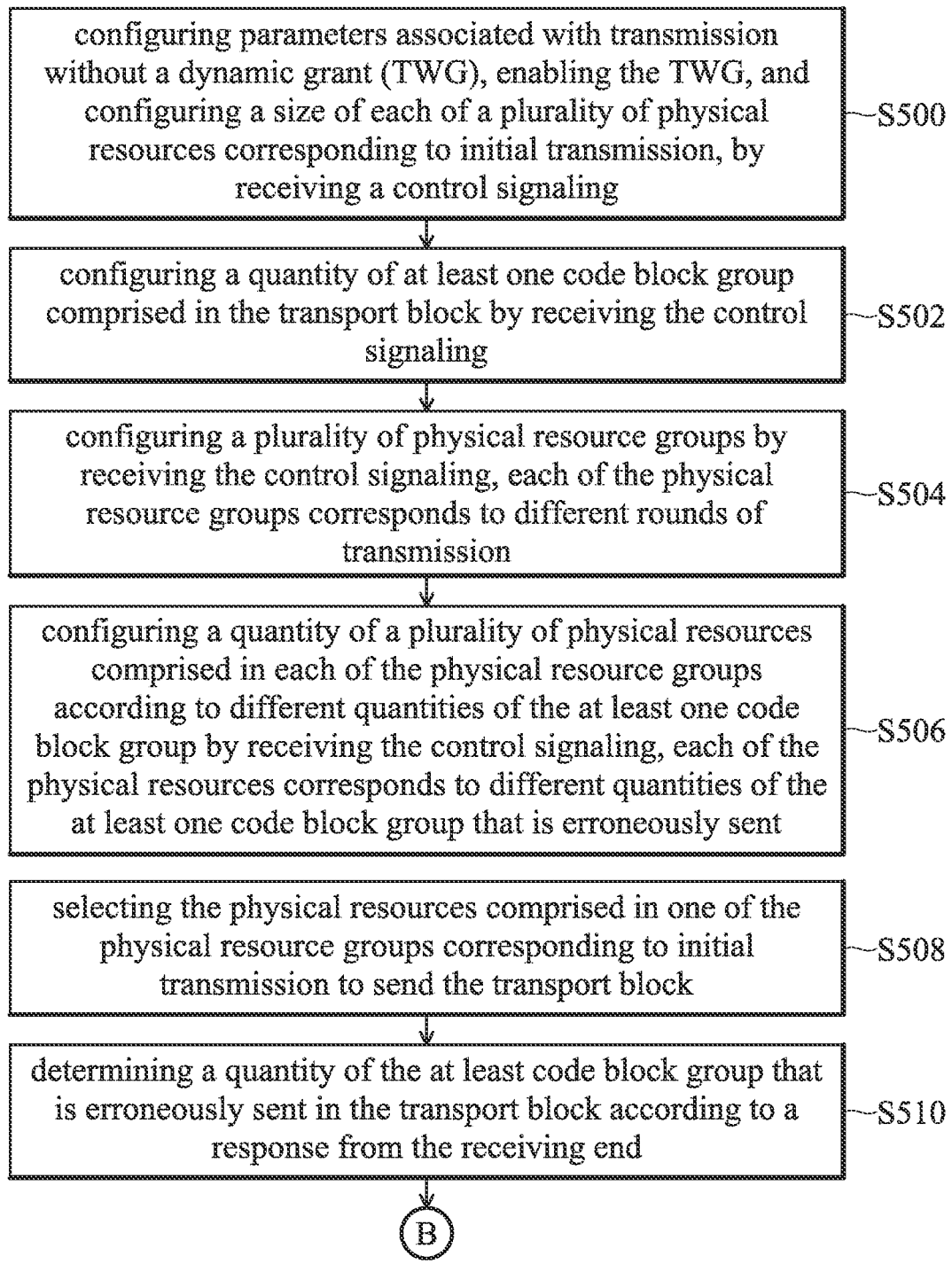
FIGS. 5A and 5B are flowcharts of a data retransmission method based on a code block group in accordance with another embodiment of the present invention.
Figure 5B:
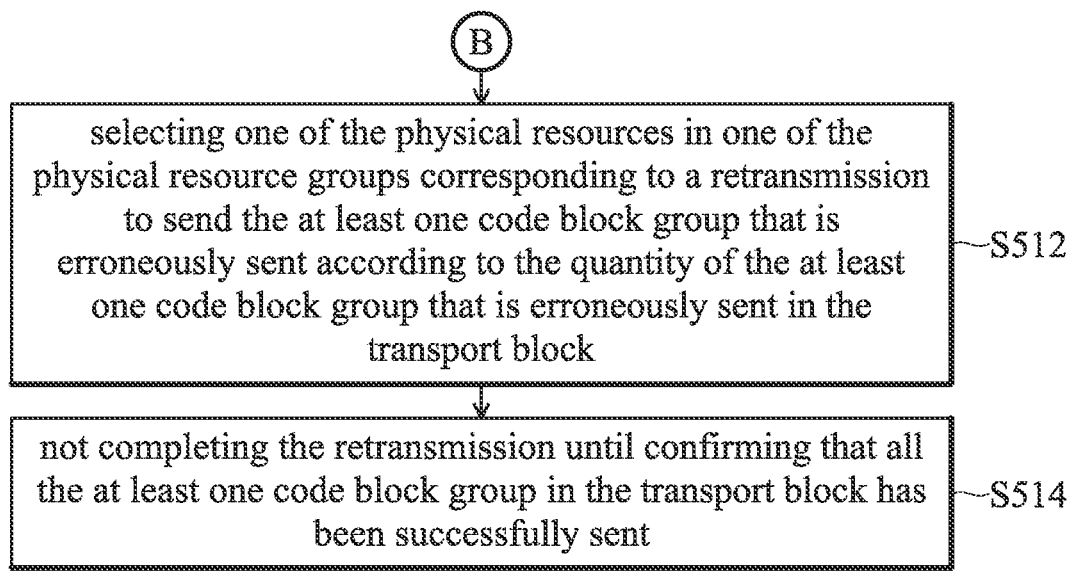

FIGS. 5A and 5B are flowcharts of a data retransmission method based on a code block group in accordance with another embodiment of the present invention. The flowcharts in FIGS. 5A and 5B are for uplink transmission. As shown in FIGS. 5A and 5B, the data retransmission method based on a code block group of the present invention includes: configuring parameters associated with transmission without a dynamic grant (TWG), enabling the TWG (3GPP TS 38.321) (3GPP TS 38.331), and configuring the size of each of the physical resources corresponding to the initial transmission, by receiving a control signaling (step S500); configuring a quantity of code block groups included in the transport block by receiving the control signaling (step S502); configuring a plurality of physical resource groups by receiving the control signaling, each of the physical resource groups corresponds to different rounds of transmission (step S504); configuring a quantity of a plurality of physical resources included in each of the physical resource groups according to the different quantities of code block groups by receiving the control signaling, each of the physical resources corresponds to the different quantities of code block groups that were erroneously sent (step S506); selecting the physical resources included in one of the physical resource groups corresponding to the initial transmission to send the transport block (step S508); determining a quantity of code block groups that were erroneously sent in the transport block according to the response from the receiving end (step S510); selecting one of the physical resources in one of the physical resource groups corresponding to the retransmission to send the code block groups that are erroneously sent according to the quantity of code block groups that were erroneously sent in the transport block (step S512); and not completing the retransmission until confirming that all of the code block groups in the actual transport block have been successfully sent (step S514).

In step S500, the UE receives the control signaling from the base station, configures the parameters associated with the TWG (3GPP TS 38.321) (3GPP TS 38.331), and enables the TWG. The parameters associated with the TWG includes: Configured Scheduling Radio Network Temporary Identifier (cs-RNTI), and number of Configured Hybrid Automatic Repeat Request (HARQ), but the present invention is not limited thereto. The control signaling may be, for example, at least one of a radio resource control (RRC) signaling, a physical layer (L1)/data link layer (L2) control signaling, or both. In step S502, the UE configures the quantity of code block groups included in the transport block by receiving the control signaling. In step S504, the UE configures a plurality of physical resource groups by receiving the control signaling. For example, the base station and the UE may be configured to perform transmission using a first physical resource group in an initial transmission associated with the TWG, to perform transmission using a second physical resource group in a first retransmission associated with the TWG, and to perform transmission using a third physical resource group in a second retransmission associated with the TWG. In some embodiments, the first physical resource group, the second physical resource group, and the third physical resource group do not overlap each other in the time-frequency domain. In step S506, the UE configures the quantity of a plurality of physical resources included in each physical resource group according to the different quantities of code block groups by receiving the control signaling. In some embodiments, each physical resource corresponds to different quantities of code block groups that are erroneously sent in the transport block. In other words, in step S506, the base station pre-configures the physical resources corresponding to the different quantities of code block groups that were erroneously sent in the transport block. In step S508, the UE selects a physical resource included in one of the physical resource groups corresponding to the initial transmission (e.g. the first physical resource group) to send the transport block to the base station. In step S510, the UE receives a response from the base station to determine the quantity of code block groups that were erroneously sent in the transport block. In some embodiments, the response associated with the TWG is a configured grant downlink feedback information (CG-DFI). The CG-DFI includes acknowledgement messages (ACK/NACK) corresponding to each code block groups in the transport block.

The second physical resource group used for the first retransmission includes a plurality of physical resources, such as a first physical resource, a second physical resource, . . . , the Lth physical resource. In step S512, when there is one code block group that was erroneously sent, the base station selects the first physical resource in the second physical resource group to send the one code block group that was erroneously sent in the first retransmission. When there are two code block groups that are erroneously sent, the base station selects the second physical resource in the second physical resource group to send the two code block groups that are erroneously sent in the first retransmission. When there are x code block groups (for example, 4 code block groups) that are erroneously sent, the base station selects the xth physical resource in the second physical resource group to send the x code block groups that are erroneously sent in the first retransmission. In some embodiments, the first physical resource, the second physical resource, . . . , the xth physical resource partially overlap each other in time-frequency domain. Since the base station only uses one of the physical resources in the second physical resource group in the first retransmission, the physical resources partially overlap each other in time-frequency domain, which can effectively reduce the occupied bandwidth. In some embodiments, the total quantity of physical resources included in the second physical resource group corresponding to the first retransmission is equal to the quantity of code block groups.

In step S514, the UE does not complete the retransmission until the UE confirms that all of the code block groups in the transport block have been successfully sent. For example, when the transport block includes 4 code block groups, the UE must receive the CG-DFI including a total of 4 positive acknowledgement messages (ACK) from the base station to confirm that all code block groups have been successfully sent.

Figure 6A:
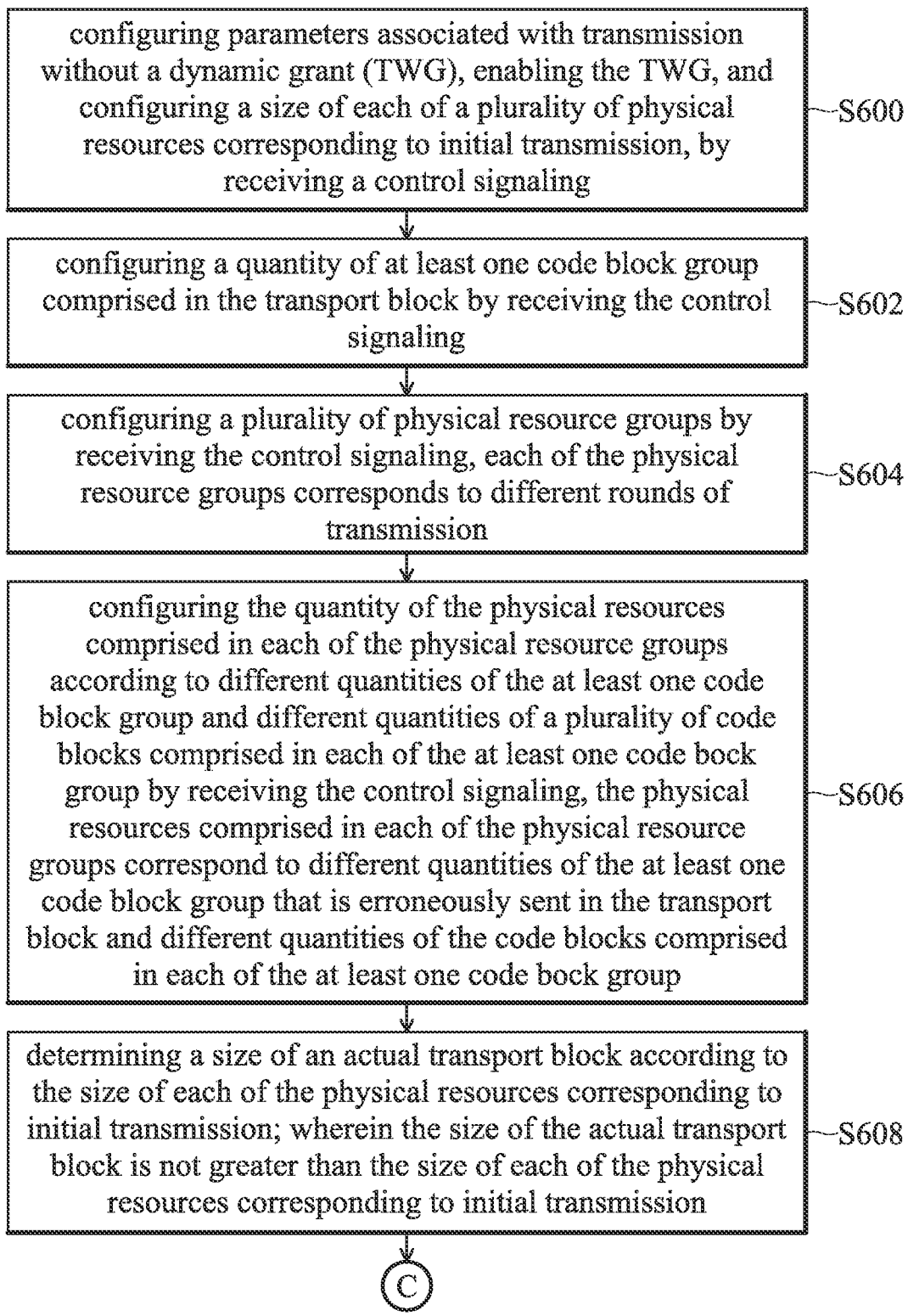
FIGS. 6A and 6B are flowcharts of a data retransmission method based on a code block group in accordance with another embodiment of the present invention.
Figure 6B:
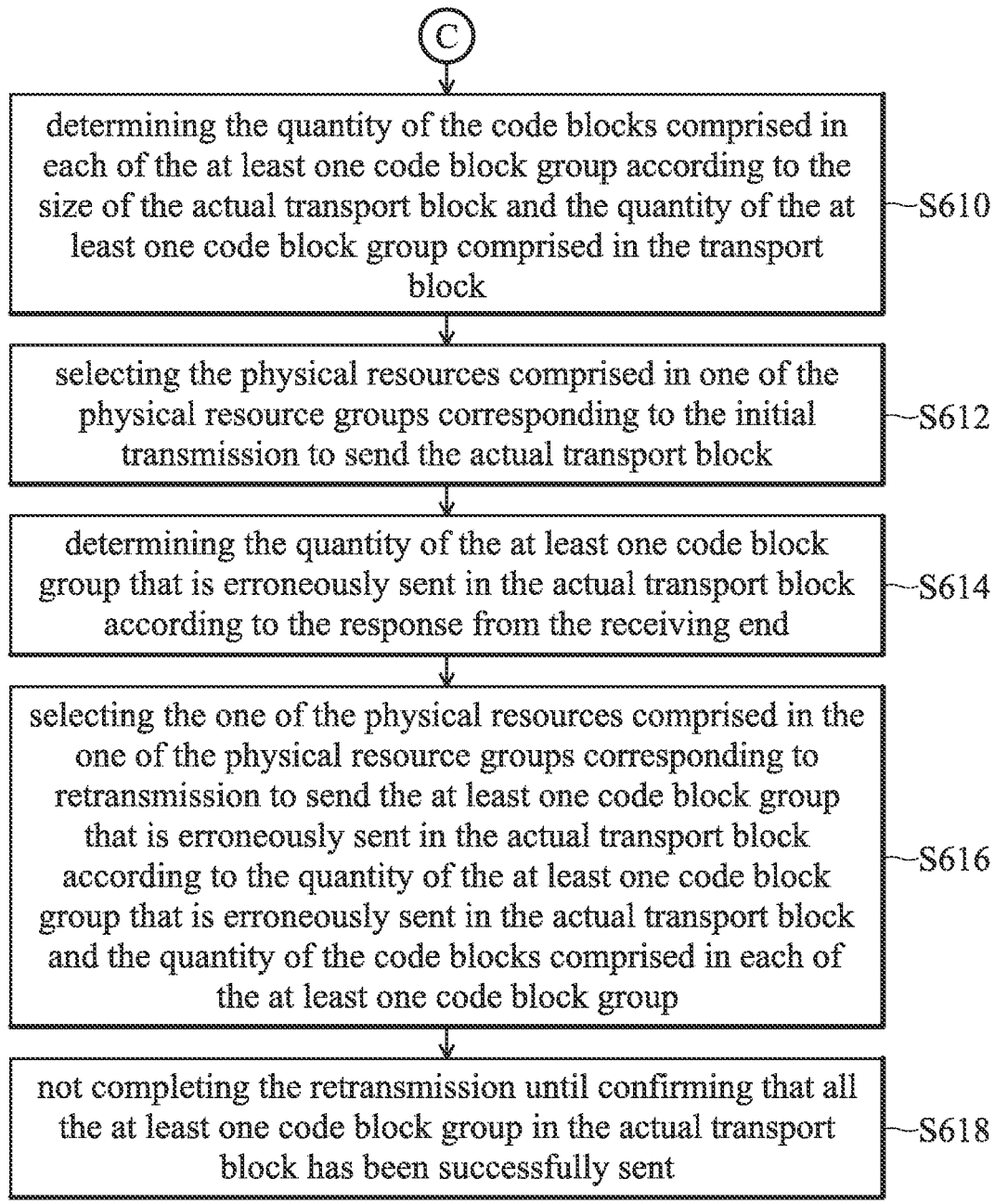

FIGS. 6A and 6B are flowcharts of a data retransmission method based on a code block group in accordance with another embodiment of the present invention. The flowcharts in FIGS. 6A and 6B are for uplink transmission. As shown in FIGS. 6A and 6B, the data retransmission method based on a code block group of the present invention includes: configuring parameters associated with transmission without a dynamic grant (TWG), enabling the TWG (3GPP TS 38.321) (3GPP TS 38.331), and configuring the size of each of the physical resources corresponding to the initial transmission, by receiving a control signaling (step S600); configuring a quantity of code block groups included in the transport block by receiving the control signaling (step S602); configuring a plurality of physical resource groups by receiving the control signaling, each of the physical resource groups corresponds to different rounds of transmission (step S604); configuring the quantity of physical resources included in each of the physical resource groups according to the different quantities of code block groups and the different quantities of code blocks included in each code block group by receiving the control signaling, the physical resources included in each of the physical resource groups correspond to the different quantities of code block groups that were erroneously sent in the transport block and the different quantities of code blocks included in each of the code block groups (step S606); determining the size of the actual transport block according to the size of each of the physical resources corresponding to the initial transmission, the size of the actual transport block is not greater than the size of each of the physical resources corresponding to the initial transmission (step S608); determining the quantity of code blocks included in each of the code block groups according to the size of the actual transport block and the quantity of code block groups included in the transport block (step S610); selecting the physical resources included in one of the physical resource groups corresponding to the initial transmission to send the actual transport block (step S612); determining the quantity of code block groups that were erroneously sent in the actual transport block according to the response from the receiving end (step S614); selecting the physical resource included in the physical resource group corresponding to the retransmission to send the code block groups that are erroneously sent in the actual transport block according to the quantity of code block groups that were erroneously sent in the actual transport block and the quantity of code blocks included in each of the code block groups (step S616); and not completing the retransmission until confirming that all of the code block groups in the actual transport block have been successfully sent (step S618).

Steps S600, S602, and S604 in FIG. 6A are the same as steps S500, S502, and S504 in FIG. 5A, thus may not be described again. In step S606, the UE configures a plurality of physical resource groups by receiving the control signaling. For example, the base station and the UE may be configured to perform transmission using a first physical resource group in an initial transmission associated with the TWG, to perform transmission using a second physical resource group in a first retransmission associated with the TWG, and to perform transmission using a third physical resource group in a second retransmission associated with the TWG. In some embodiments, the first physical resource group, the second physical resource group, and the third physical resource group do not overlap each other in the time-frequency domain. In step S606, the UE configures the quantity of physical resources included in each of the physical resource groups according to the different quantities of code block groups and the different quantities of code blocks included in each of the code block groups by receiving the control signaling. For example, assuming that a transport block has been configured to include 4 code block groups in step S602, and the maximum quantity of code blocks included in each code block group is M, the UE configures each physical resource group to include 4*M physical resources. In some embodiments, the quantity of code blocks included in each code block groups can be defined in the specification. In some embodiments, the physical resources included in each of the physical resource groups correspond to the different quantities of code block groups that were erroneously sent in the transport block and the different quantities of code blocks included in each of the code block groups. For example, the second physical resource group used for the first transmission includes a plurality of physical resources, such as the first physical resource, the second physical resource, . . . , the Mth physical resource, the M+1th physical resource, the M+2th physical resource, . . . , the 2Mth physical resource. The quantity of the foregoing physical resources is only an example, and is not intended to the limitation of the present invention. The first physical resource corresponds to 1 code block group that was erroneously sent and each code block group having 1 code block. The second physical resource corresponds to 1 code block group that was erroneously sent and each code block group having 2 code blocks. The Mth physical resource corresponds to 1 code block group that was erroneously sent and each code block group having M code blocks. Similarly, the M+1th physical resource corresponds to 2 code block groups that are erroneously sent and each code block group having 1 code block. The M+2th physical resource corresponds to 2 code block groups that are erroneously sent and each code block group having 2 code blocks. In other words, in the case of different quantities of code block groups and each code block group includes different quantities of code blocks, the base station pre-configures (or reserves) physical resources corresponding to the situation, so as to use the corresponding physical resources to send the transport block.

After that, in step S608, the UE determines the size of the actual transport block according to the size of each physical resource corresponding to the initial transmission. The size of the actual transport block is not greater than the size of each physical resource corresponding to the initial transmission. To put it simply, in step S600, the UE can know the maximum size of the actual transport block that can be sent according to the control signaling. In step S608, the UE has the right to determine the size of the actual transport block by itself. In step S610, the UE determines the quantity of code blocks included in each code block group according to the size of the actual transport block and the quantity of code block groups included in the transport block. In step S610, the UE divides the size of actual transport block by the quantity of code block groups included in the transport block to obtain the size of a code block group. The size of a code block is defined in the 5G NR specification, so the base station can calculate the quantity of code blocks included in the code block group according to the size of one code block group and the size of one code block. In some embodiments, the quantity of code blocks included in each code block group can be defined in the specification. In step S612, the UE selects a physical resource included in one of the physical resource groups corresponding to the initial transmission (e.g. the first physical resource group) to send the actual transport block to the base station. In step S614, the UE receives a response from the base station to determine the quantity of code block groups that are erroneously sent in the actual transport block. In some embodiments, the response is a CG-DFI. The CG-DFI includes acknowledgement messages (ACK/NACK) corresponding to each code block group in the transport block. In some embodiments, when the base station receives the transport block, the base station blindly measures the quantity of code blocks included in each of the code block groups in the transport block.

In some embodiments, the second physical resource group used for the first transmission includes a plurality of physical resources, such as the first physical resource, the second physical resource, . . . , the Mth physical resource, the M+1th physical resource, the M+2th physical resource, . . . , the 2Mth physical resource. In step S616, when there is 1 code block group that was erroneously sent and each code block group has 1 code block, the UE selects the first physical resource in the second physical resource group to send the one code block group that was erroneously sent in the first retransmission. When there is 1 code block group that was erroneously sent and each code block group has 2 code blocks, the UE selects the second physical resource in the second physical resource group to send the one code block group that was erroneously sent in the first retransmission. When there is 1 code block group that was erroneously sent and each code block group has M code blocks, the UE selects the Mth physical resource in the second physical resource group to send the one code block group that was erroneously sent in the first retransmission.

Similarly, when there are 2 code block groups that are erroneously sent and each code block group has 1 code block, the UE selects the M+1th physical resource in the second physical resource group to send the two code block groups that are erroneously sent in the first retransmission. When there are 2 code block groups that are erroneously sent and each code block group has 2 code blocks, the UE selects the M+2th physical resource in the second physical resource group to send the two code block groups that are erroneously sent in the first retransmission. When there are 2 code block groups that are erroneously sent and each code block group has a maximum of M code blocks, the UE selects the 2Mth physical resource in the second physical resource group to send the two code block groups that are erroneously sent in the first retransmission. In conclusion, when there are x code block groups that are erroneously sent and each code block group has a maximum of M code blocks, the UE selects the $[(x-1)*(M+m)]$th physical resource associated with the TWG in the corresponding physical resource group to send the x code block groups that are erroneously sent in the retransmission. M is the maximum value of the quantity of code blocks in each code block group, and m is the quantity of code blocks included in each code block group in the initial transmission. In some embodiments, x is a positive integer between 1~L, and m is a positive integer between 1~M.

In some embodiments, the first physical resource, the second physical resource, . . . , the Mth physical resource, the M+1 the physical resource, the M+2th physical resource, . . . , and the 2Mth physical resource in the second physical resource group associated with the TWG partially overlap each other in time-frequency domain. In some embodiments, the total quantity of physical resources included in the second physical resource group corresponding to the retransmission is equal to the product (L*M) of the quantity (L) of code block groups and the maximum quantity (M) of code blocks included in each code block group.

In step S618, the UE does not complete the retransmission until the UE confirms that all of the code block groups in the actual transport block have been successfully sent. For example, when the transport block includes 4 code block groups, the UE must receive the CG-DFI including total of 4 positive acknowledgement messages (ACK) from the base station to confirm that all code block groups have been successfully sent.

Figure 7:
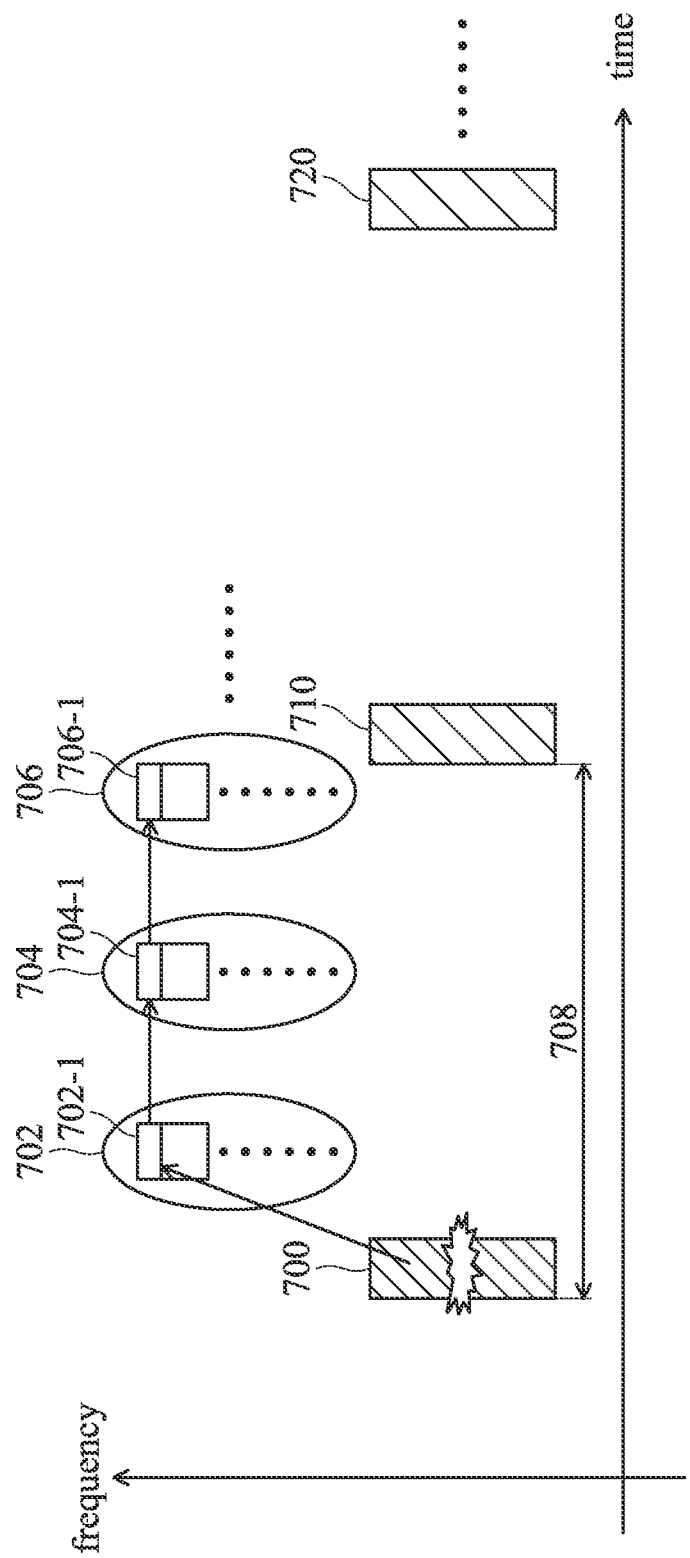
FIG. 7 is a schematic diagram of applying the data retransmission method of the present invention to transmission without a dynamic grant (TWG) in accordance with some embodiments of the present invention.

FIG. 7 is a schematic diagram of applying the data retransmission method of the present invention to transmission without a dynamic grant (TWG) in accordance with some embodiments of the present invention. As shown in FIG. 7, the UE configures a physical resource 700, a physical resource group 702, a physical resource group 704, a physical resource group 706, a physical resource 710, and a physical resource 720. The physical resource 700 is used for the initial transmission. The physical resource group 702 is used for the first retransmission. The physical resource group 704 is used for the second retransmission. The physical resource group 706 is used for the third retransmission. The physical resource 710 is used for the second initial transmission. The physical resource 720 is used for the third initial transmission.

In some embodiments, the UE selects the physical resource 700 corresponding to the initial transmission to send the transport block. Then, the UE determines the quantity of code block groups that are erroneously sent in the transport block according to the response from the base station. The UE selects the physical resource 702-1 included in the physical resource group 702 corresponding to the first retransmission according to the quantity of code block groups that are erroneously sent in the transport block to send the code block groups that are erroneously sent in the transport block. If the UE determines that there are still code block groups that are erroneously sent in the transport block according to the response from the base station in the first retransmission, the UE selects the physical resource 704-1 included in the physical resource group 704 corresponding to the second retransmission according to the quantity of code block groups that are erroneously sent to send the quantity of code block groups that are erroneously sent in the transport block.

Similarly, if there are still code block groups that are erroneously sent in the second retransmission, the UE selects the physical resource 706-1 included in the physical resource group 706 corresponding to the third retransmission according to the quantity of code block groups that are erroneously sent in the transport block to send the code block groups that are erroneously sent in the transport block. The retransmission associated with the TWG is not completed until the UE confirms that all of the code block groups in the transport block have been successfully sent. In some embodiments, a time slot 708 is the time interval between the physical resource 700 and the physical resource 710. In other words, the time slot 708 is the time interval between the initial transmission and the second initial transmission (3GPP TS 38.321).

In some embodiments, in another application of the TWG, the UE further configures the physical resources included in each of the physical resource groups 702, 704, and 706 and the physical resources 700, 710 and 720 by receiving the control signaling. For example, the physical resources included in each of the physical resource groups 702, 704 and 706 correspond to different quantities of code block groups that were erroneously sent and the different quantities of code blocks included in each code block group. The UE can determine the size of the actual transport block by itself. The UE divides the size of the actual transport block by the quantity of code block groups included in the transport block to obtain the size of one code block group. The size of a code block is defined in the 5G NR specification, so the UE can calculate the quantity of code blocks included in the code block group according to the size of one code block group and the size of one code block. In some embodiments, the quantity of code blocks included in each code block group may be defined in the specification. In the application of the TWG, the data retransmission method based on a code block group of the present invention is the same as steps S612~S618 in FIGS. 6A and 6B, so it will not be repeated.

Figure 8:
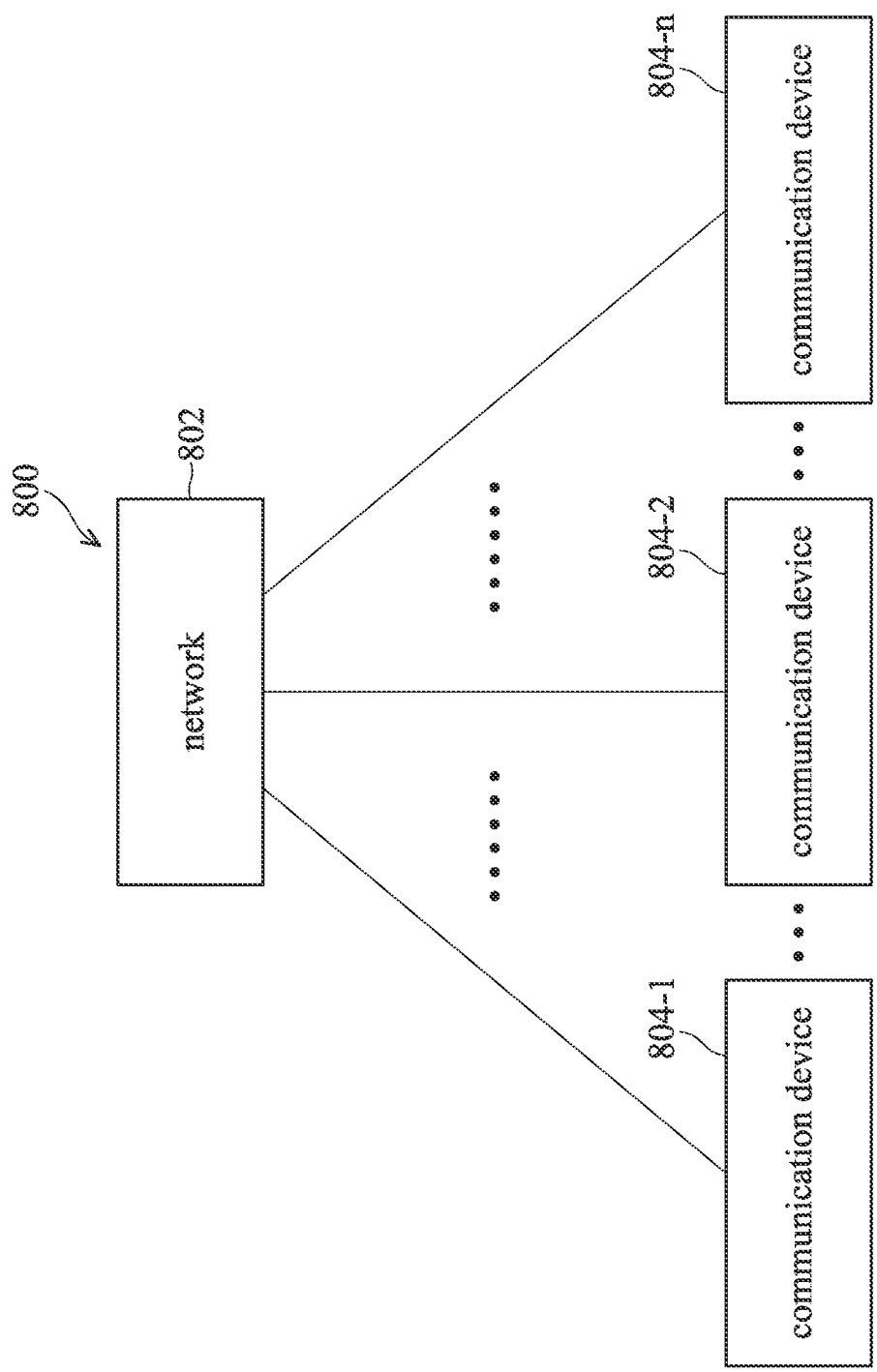
FIG. 8 is a schematic diagram of a communication system 800 in accordance with some embodiments of the present invention.

FIG. 8 is a schematic diagram of a communication system 800 in accordance with some embodiments of the present invention. As shown in FIG. 8, the communication system 800 includes a network 802, and communication devices 804-1, 804-2, . . . , 804-n. in some embodiments, the network may be an evolved radio access network (UTRAN), including at least one evolved node B (eNB), and/or a long term evolution (LTE) system, a next generation NB (gNB), a long term evolution advanced (LTE-A) system, or at least one relay in a 5G NR system. The eNB, the gNB and the relay may be referred to as base stations. In some embodiments, the base station executes steps S100~S112 in FIG. 1 and steps S200~S216 in FIGS. 2A and 2B. In some embodiments, each of the communication devices 804-1, 804-2, . . . , 804-n executes steps S500~S514 in FIGS. 5A and 5B and steps S600~S618 in FIGS. 6A and 6B.

Figure 9:
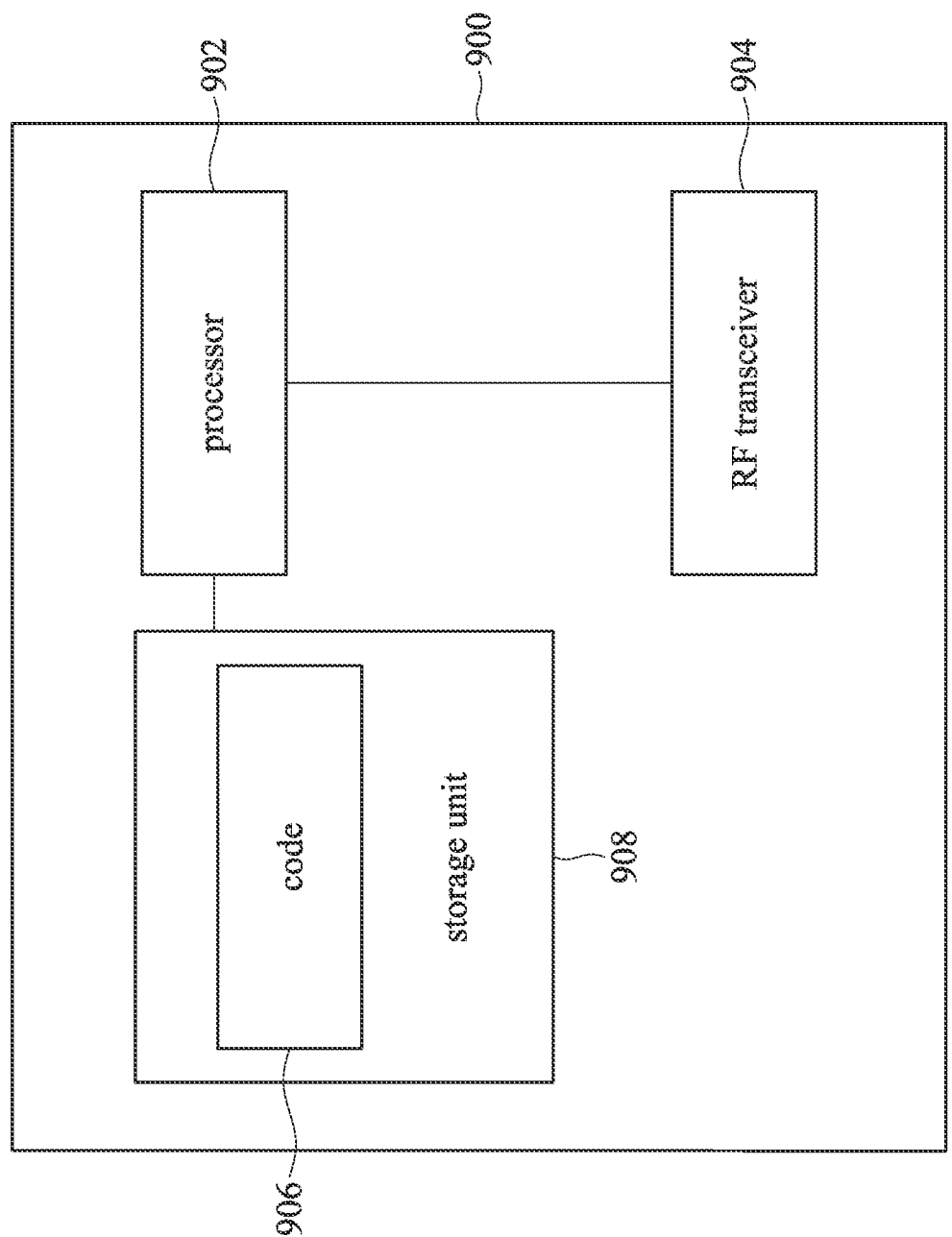
FIG. 9 is a schematic diagram of a communication device 900 in accordance with some embodiments of the present invention.

FIG. 9 is a schematic diagram of a communication device 900 in accordance with some embodiments of the present invention. As shown in FIG. 9, the communication device 900 includes a processor 902, an RF transceiver 904, and a storage unit 908. In some embodiments, the storage unit 908 stores a code 906. In some embodiments, the communication device 900 can be a base station or user equipment, but the present invention is not limited thereto. The processor 902 may be a microprocessor or an application specific integrated circuit (ASIC). The storage unit 908 may be, for example, a subscriber identity module (SIM), a read only memory (ROM), a flash memory, a random access memory, a hard disk, and an optical storage device. The RF transceiver 904 can transmit and receive wireless signals according to the processing results of the processor 902. When the communication device 900 is a base station, the code 906 is the code for executing steps S100~S112 in FIG. 1 and steps S200~S216 in FIGS. 2A and 2B, and is executed on the processor 902. When the communication device 900 is user equipment, the code 906 is the code for executing steps S500~S514 in FIGS. 5A and 5B and steps S600~S618 in FIGS. 6A and 6B, and is executed on the processor 902.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data retransmission method based on a code block group (CBG), suitable for downlink transmission, to send a transport block (TB) to a receiving end, comprising:
configuring a quantity of at least one code block group comprised in the transport block by sending a control signaling to the receiving end;
configuring a plurality of physical resource groups by sending the control signaling to the receiving end; wherein each of the physical resource groups corresponds to different rounds of transmission;
configuring a quantity of a plurality of physical resources comprised in each of the physical resource groups according to different quantities of the at least one code block group by sending the control signaling to the receiving end; wherein each of the physical resources corresponds to different quantities of the at least one code block group that was erroneously sent;
selecting the physical resources comprised in one of the physical resource groups corresponding to initial transmission to send the transport block;
determining a quantity of the at least one code block group that was erroneously sent in the transport block according to a response from the receiving end;
selecting one of the physical resources in one of the physical resource groups corresponding to a retransmission to send the at least one code block group that was erroneously sent according to the quantity of the at least one code block group that was erroneously sent in the transport block;
not completing the retransmission until confirming that all of the code block groups in the transport block have been successfully sent;
configuring parameters associated with semi-persistent scheduling (SPS) and enabling the semi-persistent scheduling, by sending the control signaling to the receiving end;
configuring the plurality of physical resource groups associated with the SPS by sending the control signaling to the receiving end; wherein each of the physical resource groups associated with the SPS corresponds to different rounds of transmission;
configuring the quantity of a plurality of physical resources comprised in each of the physical resource groups associated with the SPS according to the different quantities of the at least one code block group by sending the control signaling to the receiving end; wherein each of the physical resources corresponds to different quantities of the at least one code block group that was erroneously sent;

selecting the physical resources comprised in one of the physical resource groups associated with the SPS corresponding to the initial transmission associated with the SPS to send the transport block;

determining the quantity of the at least one code block group that was erroneously sent in the transport block according to the response from the receiving end;

selecting one of the physical resources in one of the physical resource groups associated with the SPS corresponding to a retransmission associated with the SPS to send the at least one code block group that was erroneously sent according to the quantity of the at least one code block group that was erroneously sent in the transport block; and not completing the retransmission associated with the SPS until confirming that all of the code block groups in the transport block have been successfully sent.

2. The data retransmission method as claimed in claim 1, wherein the total quantity of the physical resources comprised in the physical resource group corresponding to the retransmission is equal to the quantity of the at least one code block group.

3. The data retransmission method as claimed in claim 1, wherein the physical resources partially overlap each other in a time-frequency domain.

4. The data retransmission method as claimed in claim 1, further comprising:

configuring the quantity of the physical resources comprised in each of the physical resource groups according to the different quantities of the at least one code block group and different quantities of a plurality of code blocks comprised in each code block group by sending the control signaling to the receiving end; wherein the physical resources comprised in each of the physical resource groups correspond to different quantities of the at least one code block group that was erroneously sent in the transport block and different quantities of the code blocks comprised in each code block group;

determining a size of the transport block according to a channel status; and sending information about the size of the transport block to the receiving end by sending the control signaling to the receiving end.

5. The data retransmission method as claimed in claim 4, further comprising:

determining the quantity of the code blocks comprised in each code block group according to the size of the transport block and the quantity of the at least one code block group comprised in the transport block.

6. The data retransmission method as claimed in claim 5, further comprising:

selecting the physical resource comprised in the physical resource group corresponding to the retransmission to send the at least one code block group that was erroneously sent in the transport block according to the quantity of the at least one code block group that was erroneously sent and the quantity of the code blocks comprised in each code block group.

7. The data retransmission method as claimed in claim 6, wherein the total quantity of the physical resources comprised in the physical resource group corresponding to the retransmission is equal to the product of the quantity of the at least one code block group and the quantity of the code blocks comprised in each code block group.

8. The data retransmission method as claimed in claim 1, further comprising:

configuring the quantity of the physical resources comprised in each of the physical resource groups associated with the SPS according to the different quantities of the at least one code block group and different quantities of a plurality of code blocks comprised in each code block group by sending the control signaling to the receiving end; wherein the physical resources comprised in each of the physical resource groups associated with the SPS correspond to different quantities of the at least one code block group that was erroneously sent in the transport block and different quantities of the physical resources comprised in each of the physical resource groups;

determining a size of the transport block according to a channel status;

sending information about the size of the transport block to the receiving end by sending the control signaling to the receiving end; and determining the quantity of the code blocks comprised in each code block group according to the size of the transport block and the quantity of the at least one code block group comprised in the transport block.

9. The data retransmission method as claimed in claim 8, further comprising:

selecting the physical resource comprised in the physical resource group associated with the SPS corresponding to the retransmission associated with the SPS to send the at least one code block group that was erroneously sent in the transport block according to the quantity of the at least one code block group that was erroneously sent in the transport block and the quantity of the code blocks comprised in each code block group.

10. The data retransmission method as claimed in claim 1, wherein the physical resources partially overlap each other in a time-frequency domain.

11. A data retransmission method based on a code block group, suitable for uplink transmission, to send a transport block to a receiving end, comprising:

configuring parameters associated with transmission without a dynamic grant (TWG), enabling the TWG, and configuring a size of each of a plurality of physical resources corresponding to the initial transmission, by receiving a control signaling;

configuring a quantity of at least one code block group comprised in the transport block by receiving the control signaling;

configuring a plurality of physical resource groups by receiving the control signaling; wherein each of the physical resource groups corresponds to different rounds of transmission;

configuring a quantity of a plurality of physical resources comprised in each of the physical resource groups according to different quantities of the at least one code block group by receiving the control signaling; wherein each of the physical resources corresponds to different quantities of the at least one code block group that was erroneously sent;

selecting the physical resources comprised in one of the physical resource groups corresponding to the initial transmission to send the transport block;

determining the quantity of the at least one code block group that was erroneously sent in the transport block according to the response from the receiving end;

selecting one of the physical resources in one of the physical resource groups corresponding to the retransmission to send the at least one code block group that was erroneously sent according to the quantity of the at least one code block group that was erroneously sent in the transport block;

not completing the retransmission until confirming that all of the code block groups in the transport block have been successfully sent;

configuring the quantity of the physical resources comprised in each of the physical resource groups according to the different quantities of the at least one code block group and different quantities of a plurality of code blocks comprised in each code block group by receiving the control signaling; wherein the physical resources comprised in each of the physical resource groups correspond to different quantities of the at least one code block group that was erroneously sent in the transport block and different quantities of the code blocks comprised in each code block group;

determining a size of an actual transport block according to the size of each of the physical resources corresponding to the initial transmission; wherein the size of the actual transport block is not greater than the size of each of the physical resources corresponding to the initial transmission;

determining the quantity of code blocks comprised in each code block group according to the size of the actual transport block and the quantity of the at least one code block group comprised in the transport block;

selecting the physical resources comprised in one of the physical resource groups corresponding to the initial transmission to send the actual transport block;

determining the quantity of the at least one code block group that was erroneously sent in the actual transport block according to the response from the receiving end;

selecting the physical resource comprised in the physical resource group corresponding to the retransmission to send the at least one code block group that was erroneously sent in the actual transport block according to the quantity of the at least one code block group that was erroneously sent in the actual transport block and the quantity of the code blocks comprised in each code block group; and not completing the retransmission until confirming that all of the code block groups in the actual transport block have been successfully sent.

12. The data retransmission method as claimed in claim 11, wherein the response from the receiving end is configured grant downlink feedback information (CG-DFI); and the CG-DFI comprises an acknowledgement message (ACK/NACK) corresponding to each code block group in the transport block.

13. The data retransmission method as claimed in claim 11, wherein the receiving end is a base station; and when the base station receives the transport block, the base station blindly measures the quantity of the code blocks comprised in each code block group in the transport block.

14. The data retransmission method as claimed in claim 11, wherein the total quantity of the physical resources comprised in the physical resource group corresponding to the retransmission is equal to the product of the quantity of the at least one code block group and the quantity of the code blocks comprised in each code block group.

15. The data retransmission method as claimed in claim 11, wherein the total quantity of the physical resources comprised in the physical resource group corresponding to the retransmission is equal to the quantity of the at least one code block group.

16. The data retransmission method as claimed in claim 11, wherein the physical resources partially overlap each other in a time-frequency domain.

* * * * *